Patented Sept. 11, 1945

2,384,553

UNITED STATES PATENT OFFICE 2,384,553

ALCOHOL ANTIFREEZE LIQUIDS

Alfred D. Kiffer, Buffalo, N. Y., assignor to Carbide and Carbon Chemicals Corporation, a corporation of New York No Drawing. Application September 29, 1943, Serial No. 504,262

11 Claims. (Cl. 252—75)

The invention is concerned with alcoholic antifreeze liquids of the type used as cooling fluids in internal combustion engines, and in particular it relates to improved inhibitor compositions for such fluids.

Alcohols commonly employed as freezing-point depressants in cooling fluids include methanol, ethanol, propanol, ethylene glycol, other glycols and polyglycols, and glycerol. Such alcohols are not inherently corrosive toward metals, but in their use as coolants in circulatory systems many conditions are encountered which may create or induce a corrosive action. Rapid circulation and agitation of the coolant is customary, and may induce aeration. This, together with localized overheating and other deleterious factors difficult to avoid, may impart corrosive properties to the coolant. It is, therefore, common practice to employ inhibitor additives with alcohol anti-freeze liquids to protect the metals in a cooling system, and while many compositions have been proposed for this purpose inhibitors more generally effective are desirable.

The object of the present invention is to provide improved inhibitor materials for alcohol anti-freeze liquids, and thus further to provide alcohol coolants in which corrosive action is more effectively repressed or prevented. A further object is to provide inhibitor compositions which are more generally applicable in their metal protective function, and which are adapted to rejuvenate or reinhibit used alcohol cooling solutions, as well as to inhibit them initially.

The inhibitor composition proposed by the invention is essentially a mixture of two components, a soluble borate salt and a soluble phosphate salt; with which a third component, mercaptobenzothiazole, may or may not be included, but is particularly desirable in a formula for reinhibitor purposes. These materials, each in very small concentrations, will form either two or three component inhibitor mixtures which are soluble in, or compatible with, all of the common alcohol freezing-point depressants, and which are exceptionally effective over long periods of time in their corrosion-protective action.

Suitable phosphate and borate salts for this purpose will include any such compounds which have sufficient solubility in commercial alcohols to permit their incorporation with the alcohol in proper inhibiting amounts. Sodium and potassium borates and phosphates are preferred, since they are readily available and suitably soluble in concentrated alcohols; and in the compounding of the inhibited anti-freeze liquid these salts can be initially added as such, or they can be formed in situ in the alcohol coolant. In the latter instance boric acid and phosphoric acid are first dissolved in the full strength or water-diluted alcohol, and sufficient alkali, such as caustic soda, is then added to create a pH value of from about 7.5 to 9, as measured in a water solution of 50% by volume. The borate salt in this inhibitor mixture appears to serve essentially as a buffering agent in the solution, and the phosphate seems to exert the usual function of forming a protective film on the metal surfaces. However, a cooperative corrosion-preventive action results which is far superior to that which might be expected from the known properties of the individual components, and the inhibitor effectiveness is maintained for exceptionally long periods. As a third component mercaptobenzothiazole further improves the over-all inhibitor action, and is particularly desirable in reinhibitor compositions for used coolants. The latter compound also improves the protective action on copper-containing metals.

The amounts of each component necessary for satisfactory protection may be varied to suit specific coolants, but within the broad concentration range of from 0.10% to 5.0% by weight of the alcohol of each compound, compositions can be made appropriate for use with all known anti-freeze solutions. A formula giving exceptionally good results was compounded with an ethylene glycol coolant by adding to the glycol, boric acid, phosphoric acid, and potassium or sodium hydroxide, the base component being sufficient to neutralize the acids and provide a pH value of about 8.0, as measured in a 50% by volume water solution. More specifically, the substances added to the glycol comprised, in percent by weight of the concentrated glycol, 1.0% boric acid ($H_3BO_3$), 0.6% phosphoric acid ($H_3PO_4$), and 1.6% potassium hydroxide; or, in substitution for the latter, 1.1% sodium hydroxide. In another embodiment 0.05% to 0.10% of mercaptobenzothiazole was included as a third component, with the same relative proportions of the phosphate-borate mixture.

As already indicated, the complete inhibitor composition can be prepared prior to its addition to the coolant, and when employed for reinhibiting used anti-freeze solution, a product in dry powder form is usually desirable. A formula of the latter type which has proven very effective consisted of 52.4% by weight of anhydrous trisodium phosphate or disodium phosphate, 42.4% of anhydrous sodium tetraborate (Na$_2$B$_4$O$_7$), and 5.2% of mercaptobenzothiazole.

Many tests on the mixtures here disclosed indicate their general usefulness both for initially inhibiting alcohol coolants, and for rejuvenating used coolants in which previously incorporated inhibitors have been wholly or partially depleted. In the latter respect there is a particular advantage in the invention, as most prior-known inhibitor additives are not adaptable for reinhibiting purposes. The specific formulae disclosed are representative only, and many modifications of these are possible, particularly where the presence of other additives along with those here disclosed may be found desirable. Such modifications are intended to be included within the appended claims.

I claim:

1. An anti-freeze cooling fluid comprising a water-soluble alcohol freezing-point depressant, and an inhibitor composed of a mixture of soluble inorganic borate and inorganic phosphate salts.

2. An anti-freeze cooling fluid comprising a water-soluble alcohol freezing-point depressant, and an inhibitor composed of a mixture of a soluble inorganic borate salt, a soluble inorganic phosphate salt, and mercaptobenzothiazole.

3. An anti-freeze cooling fluid comprising a water-soluble alcohol freezing-point depressant, and an inhibitor composed of a mixture of borate and phosphate salts of an alkali metal, each component in an amount of about 0.10% to 5.0% by weight of the alcohol.

4. An antifreeze cooling fluid comprising a water-soluble alcohol freezing-point depressant, and an inhibitor composed of a mixture of a borate salt of an alkali metal, a phosphate salt of an alkali metal, and mercaptobenzothiazole, each of said components being present in an amount of about 0.10% to 5.0% by weight of the alcohol.

5. An anti-freeze cooling fluid comprising an ethylene glycol freezing-point depressant and an inhibitor composed of a mixture of potassium borate and potassium phosphate, said composition being formed in situ in the glycol by addition thereto, in percent by weight of the glycol, of about 1.0% boric acid, about 0.6% phosphoric acid, and about 1.6% potassium hydroxide.

6. An anti-freeze cooling fluid comprising an ethylene glycol freezing-point depressant and an inhibitor composed of a mixture of sodium borate and sodium phosphate, said composition being formed in situ in the glycol by addition thereto, in percent by weight of the glycol, of about 1.0% boric acid, about 0.6% phosphoric acid, and about 1.1% sodium hydroxide.

7. An anti-freeze cooling fluid comprising an ethylene glycol freezing-point depressant and an inhibitor composed of a mixture of potassium borate, potassium phosphate and mercaptobenzothiazole; the salt components being formed in situ in the glycol by addition thereto, in percent by weight of the glycol, of about 1.0% boric acid, about 0.6% phosphoric acid, and about 1.6% potassium hydroxide; and the mercaptobenzothiazole being present in an amount of about 0.05% to 0.10% by weight of the glycol.

8. An anti-freeze cooling fluid comprising an ethylene glycol freezing-point depressant and an inhibitor composed of a mixture of sodium borate, sodium phosphate and mercaptobenzothiazole; the salt components being formed in situ in the glycol by addition thereto, in percent by weight of the glycol, of about 1.0% boric acid, about 0.6% phosphoric acid, and about 1.1% sodium hydroxide; and the mercaptobenzothiazole being present in an amount of about 0.05% to 0.10% by weight of the glycol.

9. Method of preventing corrosion of an alcohol-containing cooling fluid in a circulatory cooling system, which consists in circulating said cooling fluid with an admixture thereto of a composition comprising a mixture of a soluble inorganic borate salt and a soluble inorganic phosphate salt.

10. Method of preventing corrosion of an alcohol-containing cooling fluid in a circulatory cooling system, which consists in circulating said cooling fluid with an admixture thereto of a composition comprising a mixture of a borate salt of an alkali metal, a phosphate salt of an alkali metal, and mercaptobenzothiazole, each of said components being present in an amount of about 0.05% to 5.0% by weight of the alcohol.

11. Method of preventing corrosion of an ethylene glycol-containing cooling fluid in a circulatory cooling system, which consists in circulating said cooling fluid with an admixture thereto of a composition comprising a mixture of potassium borate, potassium phosphate and mercaptobenzothiazole; the salt components being formed in situ in the glycol by addition thereto, in percent by weight of the glycol, of about 1.0% boric acid, about 0.6% phosphoric acid, and about 1.6% potassium hydroxide; and the mercaptobenzothiazole being present in an amount of about 0.05% to 0.10% by weight of the glycol.

ALFRED D. KIFFER.